United States Patent
Wang et al.

(10) Patent No.: US 9,674,330 B2
(45) Date of Patent: Jun. 6, 2017

(54) METHOD OF IMPROVING SOUND QUALITY OF MOBILE COMMUNICATION TERMINAL UNDER RECEIVER MODE

(71) Applicants: Hongxing Wang, Shenzhen (CN); Bingke Zhu, Shenzhen (CN)

(72) Inventors: Hongxing Wang, Shenzhen (CN); Bingke Zhu, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/004,982

(22) Filed: Jan. 24, 2016

(65) Prior Publication Data

US 2016/0366260 A1 Dec. 15, 2016

(30) Foreign Application Priority Data

Jun. 10, 2015 (CN) .......................... 2015 1 0315206

(51) Int. Cl.
*H04M 1/00* (2006.01)
*H04M 1/60* (2006.01)

(52) U.S. Cl.
CPC ................................ *H04M 1/6041* (2013.01)

(58) Field of Classification Search
CPC .......... H04R 1/00; H04R 3/00; H04M 1/6041
USPC ...... 455/569.1, 149, 550.1; 381/58, 59, 107, 381/102
See application file for complete search history.

(56) References Cited

U.S. PATENT DOCUMENTS

| 9,332,104 | B2 * | 5/2016 | Louch | H04M 1/6041 |
| 2013/0279706 | A1 * | 10/2013 | Marti | G06F 3/165 |
| | | | | 381/57 |
| 2014/0126729 | A1 * | 5/2014 | Heiman | H04R 1/00 |
| | | | | 381/58 |

* cited by examiner

*Primary Examiner* — Sonny Trinh
(74) *Attorney, Agent, or Firm* — Na Xu; IPro, PLLC

(57) ABSTRACT

A mobile communication terminal is disclosed. The mobile communication terminal has Receiver Mode and hands-free mode and switchable between the modes. The terminal includes a first sound generator, which works under Receiver Mode and used for receiving and playing voice signal; a second sound generator, which works under Receiver Mode and Hands-free Mode and used for receiving and playing voice signal; when the mobile communication terminal works under Receiver Mode, the first sound generator and the second sound generator receive and play voice signal at the same time. A method of improving sound quality of the mobile communication terminal is also provided.

8 Claims, 4 Drawing Sheets

METHOD OF IMPROVING SOUND QUALITY OF MOBILE COMMUNICATION TERMINAL UNDER RECEIVER MODE

FIELD OF THE INVENTION

The present disclosure relates to communication devices, and more particularly to a mobile communication terminal.

DESCRIPTION OF RELATED ART

As we all know that cell phone includes a voice device. Generally speaking, it includes two types of voice devices. One is called as a receiver (also called as handset). The other one is called as a loudspeaker (commonly known as a speaker). The receiver is mainly used for Receiver Mode. The speaker generally is used for Speaker Mode. Under Receiver Mode, user needs press his ear close to the receiver of cell phone and then can hear clearly the voice of the receiver. The receiver needs to be designed acoustically to respond optimally when it couples with human ear. "Receiver Mode" can reach better privacy. Under loudspeaker mode, the receiver does not work but loudspeaker works. At the equal distance, sound of the loudspeaker is larger than that of the receiver, user does not need press his ear close to cell phone and can hear sound. Loudspeaker Mode can be used for playing music and it is convenient for user to press his cell phone close to ear etc.

Traditionally, the receiver is a moving-coil electric acoustic device. Generally better acoustic effect can be realized for this type of device, namely good acoustic frequency response. For the lower frequency band, such as frequency band below 200 Hz, it has the needs to promote the acoustic frequency response further. This is very necessary for obtaining HD call experience of higher bandwidth. Nontraditionally, the receiver is ceramic type device. The ceramic type device can be independent voice device and work as driver that can drive screen of cell phone to vibrate and sound. For the latter, it is not necessary to open sound hole on the front of cell phone, the water-proof ability and aesthetics of cell phone are improved. However when the receiver is ceramic type device, (comparing with traditional moving-coil receiver), the low-frequency response is not very good usually. Feeling brought by hearing is that the sound is more sharp or bass is not full enough, therefore the user experience is influenced.

Therefore, it is necessary to provide a new method to improve the sound quality of the mobile communication terminal.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to exemplary embodiments. To make the technical problems to be solved, technical solutions and beneficial effects of present disclosure more apparent, the present disclosure is described in further detail together with the figures and the embodiments. It should be understood the specific embodiments described hereby is only to explain this disclosure, not intended to limit this disclosure.

Figure 1:
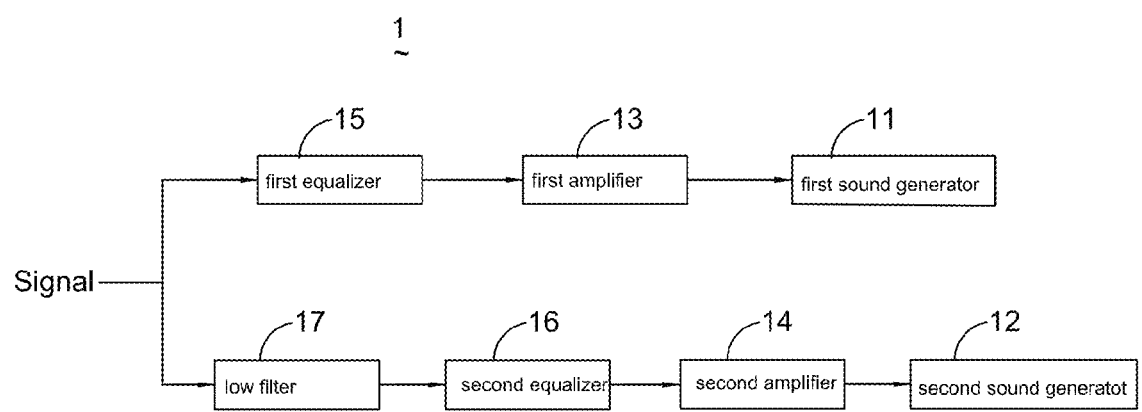
FIG. 1 is a schematic drawing of a mobile communication terminal of the disclosure.

As shown in FIG. 1, the invention provides one kind of mobile communication terminal 1 which has Receiver Mode and Hands-free Mode two types of working modes and is switchable between two types of working modes. The terminal 1 includes a first sound generator 11, which works under Receiver Mode and is used for receiving and playing voice signal, a second sound generator 12, which works under Receiver Mode and Hands-free Mode and is used for receiving and playing voice signal. Among which, when the mobile terminal 1 works under Receiver Mode, the first sound generator 11 and the second sound generator 12 receive and play voice signal at the same time, in this way sound quality under Receiver Mode can be improved obviously. When the second sound generator 12 has better low-frequency performance comparing with the first sound generator 11, the sound quality of the low frequency sound sounded by the mobile communication terminal 1 can be improved obviously under Receiver Mode.

The mobile communication terminal 1 includes a first amplifier 13 connected electrically with the first sound generator 11 and a second amplifier 14 connected electrically with the second sound generator 12. The first amplifier 13 and the second amplifier 14 use respectively the power of voice signal amplified and output to the first sound generator 11 and the second sound generator 12.

The mobile communication terminal 1 also includes a first equalizer 15 connected electrically with the first amplifier 13 and a second equalizer 16 connected electrically with the second amplifier 14. The first equalizer 15 and the second equalizer 16 are used respectively for adjusting the gain of the voice signal of the first sound generator 11 and the second sound generator 12. Through the adjustment of the second equalizer 16, it can make the low-frequency effect of the sound let out by the second sound generator 12 better.

Figure 2:
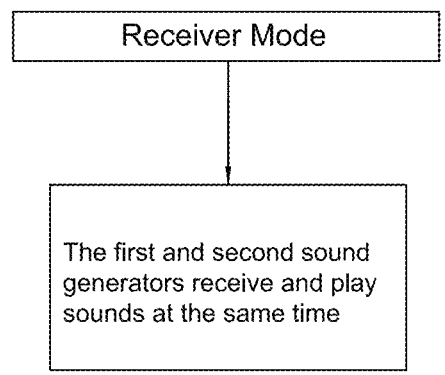
FIG. 2 is a flow diagram of a method of improving sound quality of the mobile communication terminal in FIG. 1.

The invention also provides one kind of method of improving the sound quality of mobile communication terminal 1 of the above-mentioned first embodiment under Receiver Mode by combing FIG. 1 and FIG. 2. The method includes: the mobile communication terminal 1 works under Receiver Mode. The first sound generator 11 and the second sound generator 12 receive and play voice signal at the same time.

Preferably, the second sound generator 12 is set close to the first sound generator 11. The second sound generator 12 is more close to the first sound generator 11 and has good effect on the bass reinforcing of the first sound generator 11 and can achieve good stereophonic effect.

Comparing with the mobile communication terminal 1 of the first embodiment, the low-pass filter 17 connected electrically 12 with the second sound generator 12 is set on the mobile communication terminal 1 of the second embodiment. One cut-off frequency preset on the low-pass filter 17 is used to filter the voice signal output to the second sound generator 12 that is higher than that of the cut-off frequency. The cut-off frequency is chosen according to actual demand on the response on acoustic frequency. The high-frequency signal that is higher than that of cut-off frequency can be filtered efficiently through setting a low-pass filter 17. It can reduce the power consumption of circuit and help to improve the privacy of sound. Comparing with the high-frequency sound, as the audible distance of low frequency sound is shorter, the privacy is better.

Figure 3:
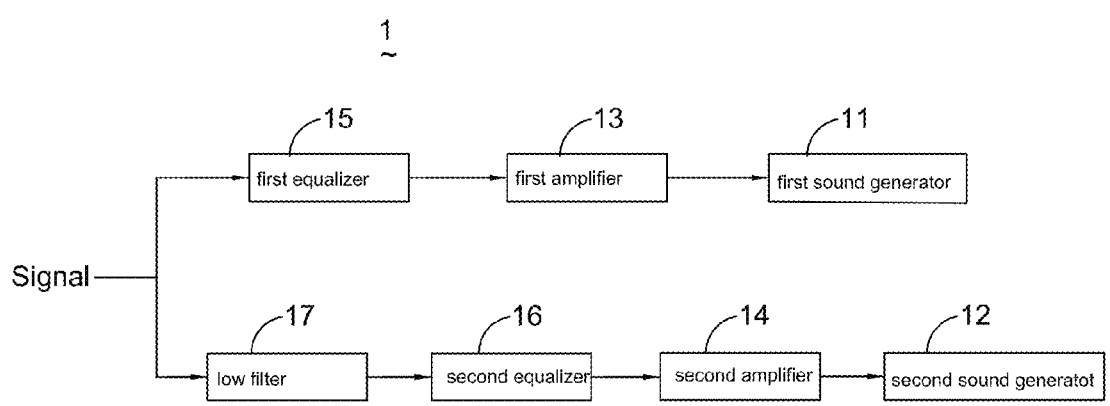
FIG. 3 is a structural schematic drawing of the mobile communication terminal of the disclosure.

As shown in FIG. 3, the invention provides additionally the second embodiment of the mobile communication terminal 1.

Similarly, in the second embodiment, the mobile communication terminal 1 includes a first amplifier 13 connected electrically with the first sound generator 11 and a second amplifier 14 set between the second sound generator 12 and a low-pass filter 17. The first amplifier 13 and the second amplifier 14 respectively are used for amplifying the power of voice signal output to the first sound generator 11 and the second sound generator 12.

The mobile communication terminal 1 also includes a first equalizer 15 connected electrically with the first amplifier 13 and a second equalizer 16 set between low-pass filter 17 and the second amplifier 14. The first equalizer 15 and the second equalizer 16 are used respectively for adjusting the gain of voice signal output to the first sound generator 11 and the second sound generator 12.

Figure 4:
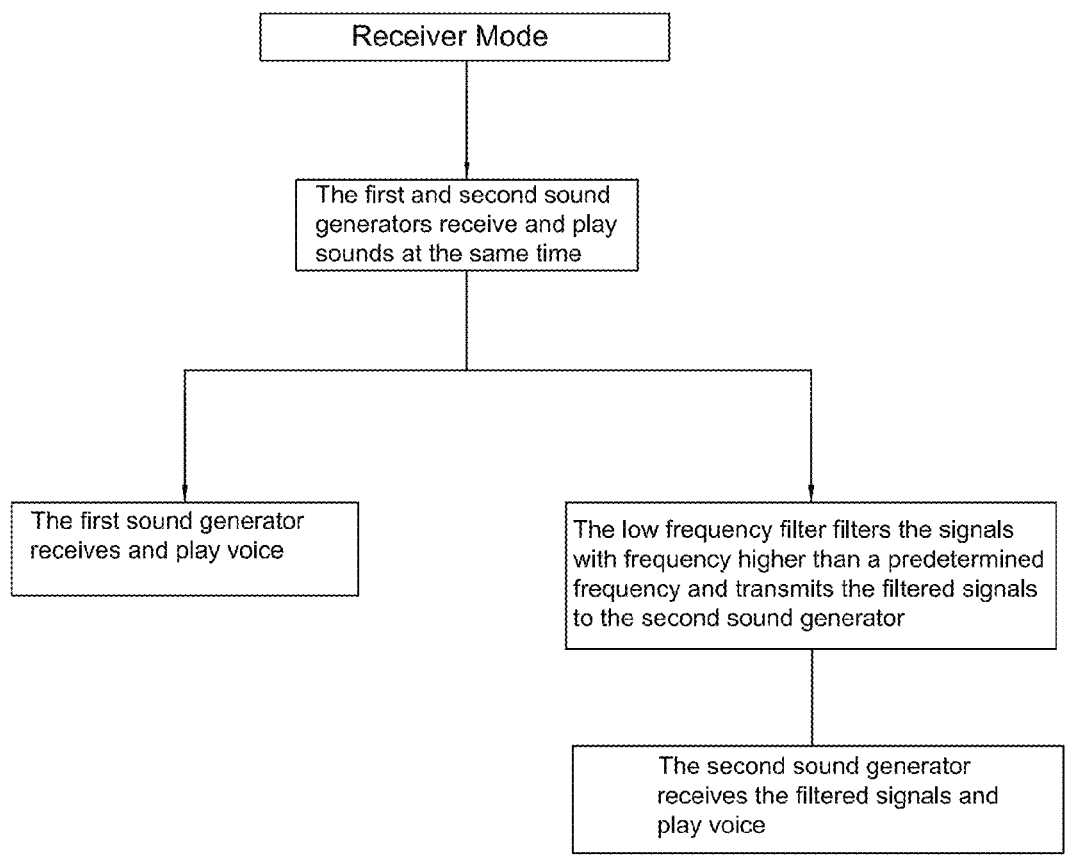
FIG. 4 is a flow diagram of the method of improving sound quality of mobile communication terminal in FIG. 3.

The invention additionally provides a method of improving sound quality of mobile communication terminal 1 under Receiver Mode by combining what is shown in FIGS. 3-4. The method includes: the mobile communication terminal 1 works under Receiver Mode. The first sound generator 11 receives and plays voice signal. The low-pass filter 17 filters the voice signal output to the second sound generator 12 that is higher than preset cut-off frequency. The second sound generator 12 receives and plays the output voice signal being processed through the low-pass filter 17.

Preferably, the second sound generator 12 is set close to the first sound generator 11.

Under Receiver Mode, the receiver is adopted to work as the first sound generator 11 for the traditional mobile communication terminal. Under the mode, user needs to press ear close to receiver to hear the sound let out by the receiver. In order to make the sound quality of the sound let out by the receiver better, generally to improve the sound quality of receiver at high frequency. It is hard for this traditional mobile communication terminal to take account of the sound quality of low frequency into account, so the mobile communication terminal 1 provided by the invention use the second sound generator 12 with better low-frequency performance and the first sound generator 11 to sound generator under Receiver Mode at the same time. The second sound generator 12 can be low-frequency speaker and full-band speaker as well. When the mobile communication terminal provided the invention works at Receiver Mode, the second sound generator 12 with better low-frequency performance is utilized to sound together with the first sound generator 11 at the same time, low-frequency effect of the sound let out by mobile communication terminal under the Receiver Mode obviously to improve the sound quality under Receiver Mode further.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mobile communication terminal having Receiver Mode and hands-free mode and switchable between the modes, including:
    a first sound generator, which works under Receiver Mode and used for receiving and playing voice signal;
    a second sound generator, which works under Receiver Mode and Hands-free Mode and used for receiving and playing voice signal;
    when the mobile communication terminal works under Receiver Mode, the first sound generator and the second sound generator receive and play voice signal at the same time; wherein, the second sound generator has better low frequency performance than the first sound generator.

2. The mobile communication terminal described in claim 1, further including a first amplifier connected electrically with the first sound generator and a second amplifier connected electrically with the second sound generator, wherein the first amplifier and the second amplifier are configured for amplifying power of the voice signal outputting to the first sound generator and the second sound generator respectively.

3. The mobile communication terminal said in claim 2 further including a first equalizer connected electrically with the first amplifier and a second equalizer connected electrically with the second amplifier, wherein the first equalizer and the second equalizer are configured for regulating gain of the voice signal outputting to the first sound generator and the second sound generator respectively.

4. A method of improving sound quality of the mobile communication terminal under the Receiver Mode described in claim 1, wherein the method includes steps of:
    the first sound generator and the second sound generator receive and play voice signal at the same time.

5. The method of improving sound quality of the mobile communication terminal in claim 4, wherein the second sound generator is close to the first sound generator.

6. A mobile communication terminal having Receiver Mode and hands-free mode and switchable between the modes, including:
    a first sound generator, which works under Receiver Mode and used for receiving and playing voice signal;
    a second sound generator, which works under Receiver Mode and Hands-free Mode and used for receiving and playing voice signal;
    a low-pass filter working under Receiver Mode, connected electrically with the second generator, and presetting with one cut-off frequency for filtering the voice signal output to the second sound generator that is higher than that of the cut-off frequency;
    when the mobile communication terminal works under Receiver Mode, the first sound generator and the second sound generator receive and play voice signal at the same time; wherein, the second sound generator has better low frequency performance than the first sound generator.

7. The mobile communication terminal described in claim 6, further including a first amplifier connected electrically with the first sound generator and a second amplifier connected electrically between the second sound generator and the low-pass filter, wherein the first amplifier and the second amplifier configured for amplifying power of the voice signal outputting to the first sound generator and the second sound generator respectively.

8. The mobile communication terminal said in claim 7 further including a first equalizer connected electrically with the first amplifier and a second equalizer connected electrically between the low-pass filter and the second amplifier, wherein the first equalizer and the second equalizer are configured for regulating gain of the voice signal outputting to the first sound generator and the second sound generator respectively.

* * * * *